Oct. 22, 1968 G. M. BAILEY 3,406,922
CENTER-WIND REEL
Filed March 10, 1967 2 Sheets-Sheet 1
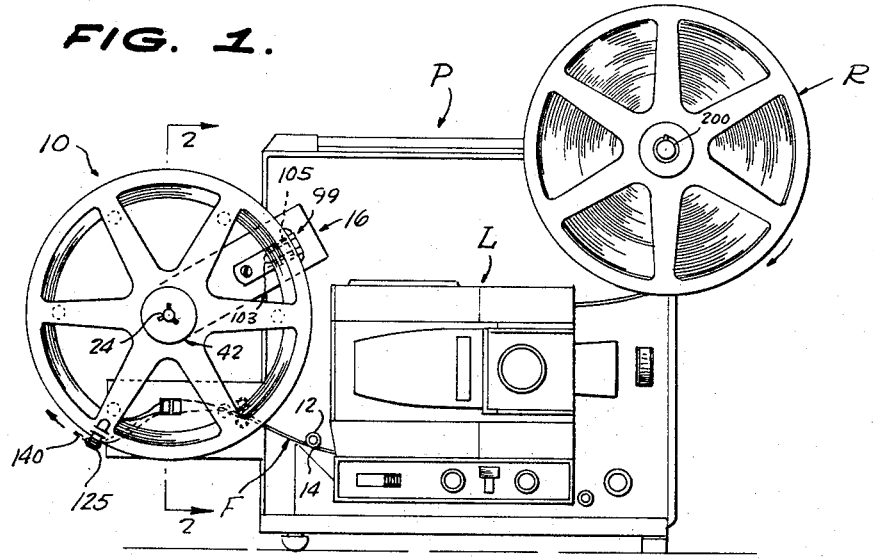
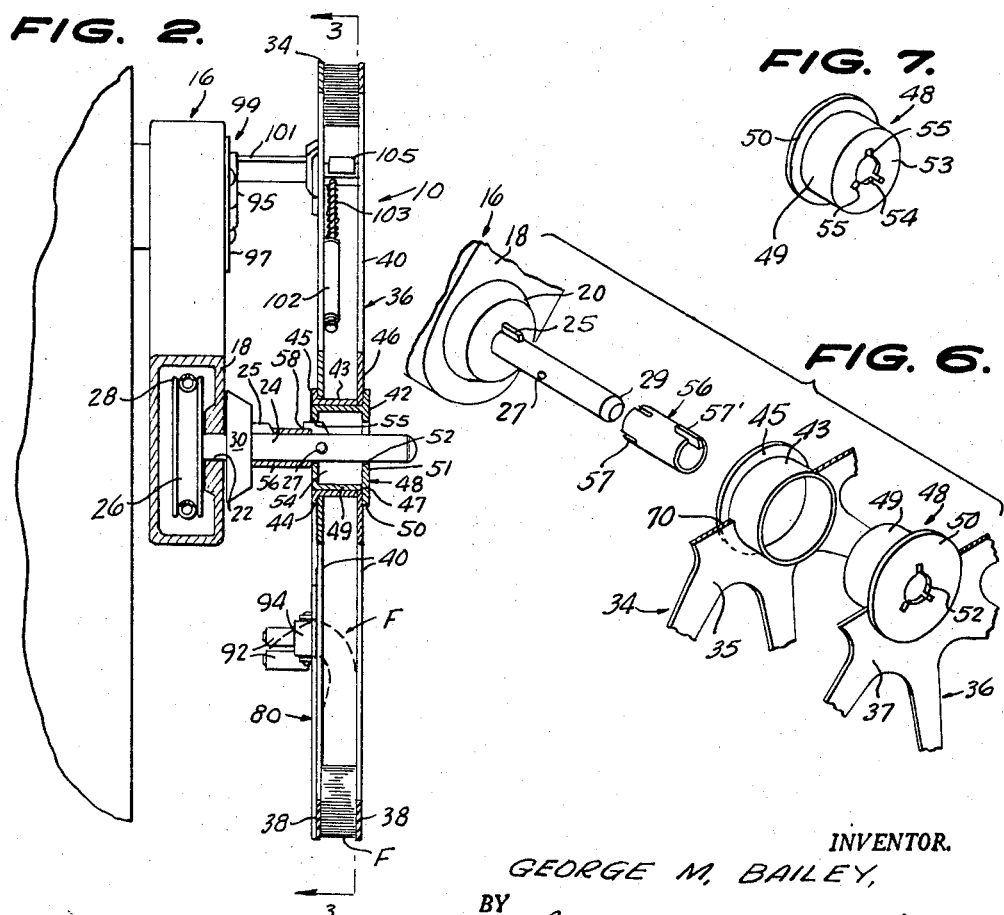
INVENTOR.
GEORGE M. BAILEY,
BY
Berman, Davidson & Berman
ATTORNEYS.

Oct. 22, 1968  G. M. BAILEY  3,406,922
CENTER-WIND REEL
Filed March 10, 1967  2 Sheets-Sheet 2
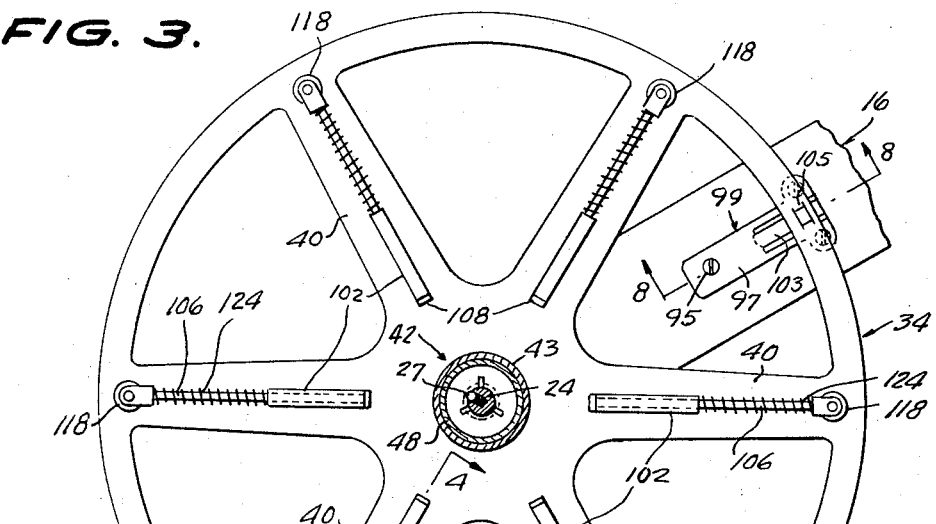
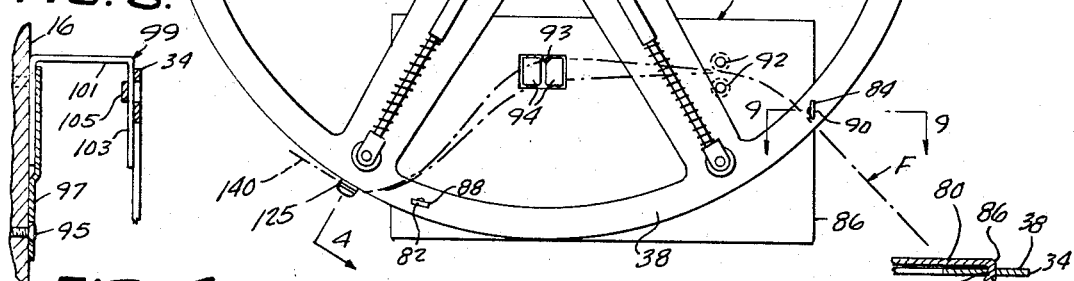
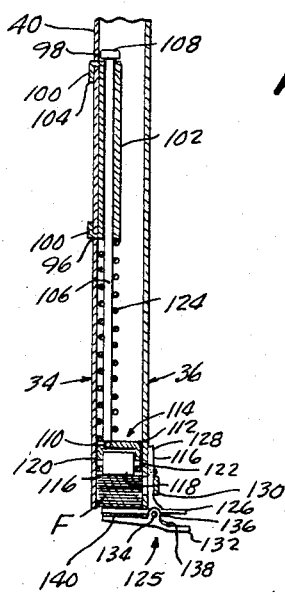
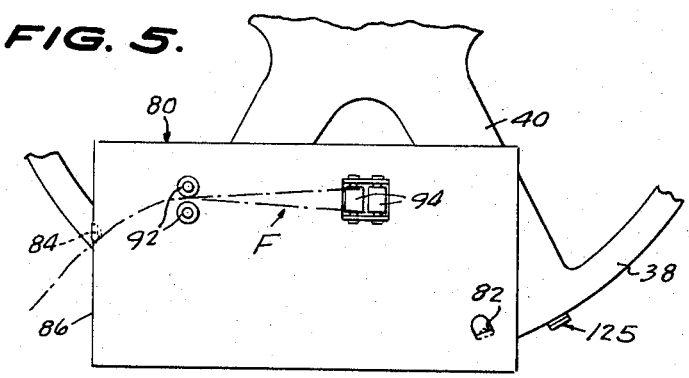
INVENTOR.
GEORGE M. BAILEY,
BY
Berman, Davidson & Berman
ATTORNEYS.

3,406,922
CENTER-WIND REEL
George M. Bailey, 680 Kohl,
Broomfield, Colo. 80020
Filed Mar. 10, 1967, Ser. No. 622,147
13 Claims. (Cl. 242—55.11)

ABSTRACT OF THE DISCLOSURE

A center-wind reel to be employed as the take-up reel for a projector. The center-wind reel has a stationary rear section and a rotatable front section, with interlocked telescoping hub portions. A ball detent on the projector take-up reel spindle engages in the hub portion of the front section to hold the reel sections together, but to still allow the front section to rotate. A plate detachably-secured to the stationary rear section carries guide rollers to turn the film coming from the projector and to feed it from inside outwardly to the rotatable front reel section. An alligator clip is detachably-secured to the rim portion of the front reel section and is employed to clamp the free outer end of the film. The stationary rear reel section has spring-biased radial slidable arms carrying rollers acting against the film strip to urge it outwardly as it coils in the take-up reel assembly. The center-wind reel assembly can be removed from the take-up spindle and can be employed as the supply reel, with the starting end of the film strip coming from the outside of the reel assembly.

---

This invention relates to a center-wind reel for film and tape.

The primary object of the invention is the provision of an efficient, simple, practical, time-saving, and easily-used device of the kind indicated, which enables placing the start of a film or tape, at the outside of the roll, to be formed on the device, and the end of the tape at the inside of the roll, so that the film or tape can be immediately rerun, without the trouble of having to rewind, and the film or tape can be reeled off, in its original sequence.

Another object of the invention is the provision of a device of the character indicated above, which is readily adaptable, with no or only minor changes in its structure, to be used with different models and makes of projectors, tape recorders, and the like.

FIGURE 1 is a front elevation, showing a device of the invention installed on a film projector, and showing the starting end of a film secured to the device preliminary to reeling the same on the device;

FIGURE 2 is an enlarged vertical section, taken on the line 2—2 of FIGURE 1;

FIGURE 3 is a vertical section, taken on the line 3—3 of FIGURE 2;

FIGURE 4 is a fragmentary section, taken on the line 4—4 of FIGURE 3;

FIGURE 5 is a fragmentary rear elevation of the feed plate and stationary or rear reel section;

FIGURE 6 is an enlarged exploded perspective view, showing the reel spindle mounting;

FIGURE 7 is a perspective view of a component of said mounting;

FIGURE 8 is an enlarged cross-sectional detail view taken substantially on line 8—8 of FIGURE 3; and FIGURE 9 is an enlarged cross-sectional detail view taken substantially on line 9—9 of FIGURE 3.

Referring in detail to the drawings, and first to FIGURES 1 to 5 thereof, the illustrated center-wind reel 10 is shown installed on a film projector P, on which is mounted a conventional film reel R, from the underside of which film F is reeled off, to pass through a lens system L. As the film F leaves the lens system L it passes under a hold-down roller 12, overlying a ramp 14. The projector P has, at the side thereof remote from the reel R, a downwardly and outwardly-angled hollow, film-receiving reel arm 16.

The arm 16 is formed, at its lower or outer end, in its forward wall 18 with an axial bore 22, through which is journaled a spindle 24 having a pulley 26 on its inner end over which is trained a driving belt 28 which is a component of the projector P, and which serves to rotate the spindle 24 in a direction to wind film on the center-wind reel 10.

Adjacent to the wall 18 the spindle 24 is formed with an enlarged diameter beveled head 30, and with a radial longitudinal rib 25 extending outwardly from the head 30. Outwardly from the rib 25 is a spring-pressed ball detent 27. The spindle has a tapered outer end 29.

The center-wind reel 10 comprises a rear or stationary section 34 and a front or rotatable section 36. Both sections have rim portions 38, and radial arms 40 extending inwardly therefrom to hub structures. A tubular hub assembly 42, larger in diameter than the head 30, is engaged over the spindle 24, and comprises an outer sleeve 43, engaged through an axial opening 44 in the rear reel section 34, and has a lateral flange 45 engaged with the rear side of the section 34. The outer end 46 of the sleeve 43 is engaged with the outer reel section 36 around an axial opening 47 therein. An inner cup-shaped hub 48 is composed of an annular sleeve 49, telescoped in the sleeve 43, and has a lateral flange 50 on its outer end which is engaged with the front side of the reel section 36. The hub 48 has an outer or front end wall 51 which is formed with an axial opening 52 which receives the spindle 24. The inner or rear end wall 53 of the hub 48 is formed with an axial opening 54 receiving the spindle 24 into which opening circumferentially-spaced radial slots 55 lead. A spacing and connecting sleeve 56 has circumferentially-spaced slots 57 in its rear or inner end which are engageable with the rib 25. At its outer end the sleeve 56 is formed with a radial longitudinal lug 57' which, in its rear edge, is formed with a notch 58 which receives and is secured to the outer edge of the sleeve 56. The lug 57' is engaged in a slot 55 in the inner end wall 53 of the hub 48. The ball detent 27 has been forced through the opening 54, into the interior of the hub. The outer reel section 36 is permanently engaged on the hub 42 and secured thereto, as by means of friction, welding, or the like.

The rear reel section 34 comprises a disc 35 fixed on the tubular hub 43 having the rear flange 45 to which the disc is welded, as at 70. The front reel section 36 comprises a disc 37 which is permanently-engaged on the hub 42, between the hub 43 and the flange 50 of the hub 42.

A feed plate 80 of horizontally-elongated form is removable-secured to the rear side of the lower part of the stationary reel section 34, by means of a resilient locking tongue 82, at the lower outer corner of the plate, and a resilient locking tongue 84, on the inner edge 86, of the plate, these tongues being securably-engaged through slots 88 and 90 formed in the rear portion 38 of the reel section 34. At a location adjacent to the inner upper corner of the plate 80, a pair of horizontal, rearwardly-extending vertically-opposed rollers 92 are journaled through which the film F is trained as it comes from the projector lens system L.

On a level with the rollers 92 and spaced outwardly therefrom, and located in an opening 93 in the plate, are a pair of vertical axis film-turning rollers 94 between which the film F passes so as to be turned one-quarter turn, out of the plane of the film passing between the rollers 92 and passed between adjacent spokes of the rear reel section 34 forwardly of the section 34.

The projector arm 16 has bolted, as indicated at 95, to an upper part thereof the vertical leg 97 of a bracket 99 having an inverted L-shaped portion 101 whose pendant terminal 103 is detachably-engaged through an out-pressed strap 105 on the rim portion of the stationary reel section 34, so as to hold this section against rotation, in either direction.

The rear reel section spokes 40 are, as shown in FIGURE 4, formed with longitudinally-spaced outer and inner slots 96 and 98, respectively, through which are engaged ears 100 on the related ends of the tubes 102, the ears being bent against the rear side of the section 34, as indicated at 104. Sliding in the tubes 102 are rods 106, substantially longer than the tubes, and provided on their inner ends with enlarged stop heads 108. At their outer ends the rods 106 are secured, as indicated at 110, to rearward portions of the cross-members 112 of U-shaped brackets 114 having spaced arms 116. Rollers 118 located between and reaching outwardly beyond the arms 116 have reduced-diameter pins 120 on their ends, which are journaled, as indicated at 122, in the arms. Coil springs 124 are circumposed on the rods 106 and are compressed between the roller brackets 114 and the adjacent ends of the tubes 102, whereby the rollers 118 are biased outwardly and are adapted to yield inwardly as film F is progressively reeled over and around the rollers as the front reel section 36 is rotated.

The front reel section 36 is provided, on its rim portion 38, with a film clip 125 which, as shown in FIGURE 4, may have the form of an alligator clip having a relatively stationary jaw 126 which extends across the peripheral edge of the section 36, and across the space between the reel sections 34 and 36. The stationary jaw 126 is provided with an inwardly-extending leg 128 which is detachably-engaged through an out-pressed strap 130 formed in the rim portion 38. A movable jaw 132 has lateral ears 134 pivoted, as indicated at 136, on the stationary jaw 126, and a spring 138 positioned between the jaws serves to bias the movable jaw toward the stationary jaw for holding the starting end 140 of the film F.

In use and operation, the film F having been passed through the two sets of rollers on the feed plate, and into the space between the reel sections, and its starting end 140 having been engaged by the clip 125, as shown in FIGURES 1 and 3, the rotatable reel section 36 is rotated clockwise, pulling the film over the roller 118 adjacent to the clip 125 and over each succeeding roller attached to the stationary section 34, so as to form the first convolution of film bearing against the rollers. As rotation continues, the entire first convolution rotates as a unit causing each roller to turn upon its own axis. Rotation of the first convolution pulls additional film onto the first roller and under the first convolution. The second convolution is thus deposited against the inner surface of the first convolution and the two layers of film continue rotation as a unit, pulling the third convolution into the roll. The first convolution thus remains the outer convolution throughout the process, and each succeeding convolution, as it is deposited upon the rollers, becomes the innermost convolution, until the final convolution is formed at the center of the roll.

The outermost convolution thus retains its original circumference and the rollers yield inwardly against the resistance of the springs 124 to accommodate the circumferential decrease in each subsequent layer of film until the final or innermost convolution is formed.

The reel 10, containing the formed roll of film, is then ready to be removed from the spindle and the feed plate 80 removed from the reel. The reel 10 can now be placed on the drive spindle 200 of the projector P, in place of the reel R, and the film run through the lens system L, in the usual way. Because of the fact that the film reeled on the center-wind reel 10 is in the same relationship to the reel 10 as it originally was on the reel R, the need for re-winding of the film before it can be re-projected by the projector P is eliminated. The drive spindle 200 is provided with a ball detent similar to the ball detent 27, to hold the reel 10 on spindle 200. Any suitable fastening means may be employed to secure the two reel sections together for use as a normal feed reel.

What is claimed is:

1. A center-wind reel comprising a relatively stationary reel section and a rotatable reel section, said sections having rim portions and spokes, the rotatable section being adapted to be engaged over a driven spindle, means for removably securing the rotatable section to such a spindle, yieldably outwardly spring-pressed roller means on the sides of the spokes of the stationary reel section facing the rotatable section, securing means on the rim portion of the rotatable reel section extending across the space between the reel sections, the starting end of a tape being adapted to be engaged with said securing means.

2. A center-wind reel assembly according to claim 1, wherein a tape feed plate is fixed to the stationary reel section, said feed plate having a first pair of opposed feed rollers through which a tape is adapted to pass, and a second pair of feed rollers through which a tape is adapted to pass after passing through the first pair of rollers, the second pair of rollers having their axes disposed at an angle of 90 degrees relative to the axes of the first pair of rollers.

3. A center-wind reel assembly according to claim 1, wherein a tape feed plate is fixed to the stationary reel section, said feed plate having a first pair of opposed feed rollers through which a take is adapted to pass, and a second pair of feed rollers through which a tape is adapted to pass after passing through the first pair of rollers, the second pair of rollers having their axes disposed at an angle of 90 degrees relative to the axes of the first pair of rollers, the axes of the first pair of feed rollers being disposed normal to the plane of the stationary reel section, the axes of the second pair of feed rollers being disposed substantially radially with respect to the stationary reel section.

4. A center-wind reel assembly according to claim 1, wherein a tape feed plate is fixed to the stationary reel section, said feed plate having a first pair of opposed feed rollers through which a tape is adapted to pass, and a second pair of feed rollers through which a tape is adapted to pass after passing through the first pair of rollers, the second pair of rollers having their axes disposed at an angle of 90 degrees relative to the axes of the first pair of rollers, said feed plate being located in the region of the rim portion of the stationary section.

5. A center-wind reel according to claim 1, wherein said roller means comprises tubes fixed lengthwise to the spokes of the stationary section, rods sliding through the tubes, the inner ends of the rods having enlarged stop heads engageable with the inner ends of the tubes, said rods being longer than the tubes, brackets fixed on the outer ends of the rods, tape-supporting rollers journaled on the brackets, and expanding spring means compressed between the outer ends of the tubes and the roller brackets.

6. A center-wind reel according to claim 1, wherein said roller means comprises tubes fixed lengthwise to the spokes of the stationary section, rods sliding through the tubes, the inner ends of the rods having enlarged stop heads engageable with the inner ends of the tubes, said rods being longer than the tubes, brackets fixed on the outer ends of the rods, tape-supporting rollers journaled on the brackets, and expanding spring means compressed between the outer ends of the tubes and the roller brackets, said brackets being U-shaped and having cross-members and outwardly-extending arms, said rods being fixed to said cross-members, the film-supporting rollers being positioned between and journaled on the bracket arms.

7. A center-wind reel assembly according to claim 1, wherein means for fixing the stationary reel section to a support comprises a bracket adapted to be secured to a support, said bracket having a terminal, and a member on the rim portion of the stationary reel section with which said terminal is securably-engageable.

8. In combination, a film projector having a lateral arm on one side thereof, a driving spindle-mounted film reel on the other side of the projector, a lens system on the projector between said arm and said reel, through which film from said reel is adapted to pass toward said arm, said arm having a driven spindle, a center-wind reel having a stationary section and a rotatable section, means fixing said stationary section to said arm, said reel sections having rim portions, and spokes, means supportably and non-rotatably-securing the rotatable reel section to such spindle, said rotatable wheel section having securing means on its rim portion and extending across the space between the reel sections, the starting end of a film being adapted to be secured to the rotatable reel section by said securing means, and film-turning means fixed to said stationary reel section in the region of its rim portion, film passing from the lens system of the projector being adapted to be turned by said turning means from a horizontal plane into a vertical plane before reaching said film-securing means, and outwardly spring-pressed film-supporting means located in the space between the reel sections, said supporting means being mounted on spokes of the stationary reel section.

9. The combination of claim 8, wherein said film-supporting means comprises tubes fixed to and extending lengthwise of the spokes of the stationary reel section, rods longer than the tubes and sliding in the tubes, said rods having stop heads on their inner ends, film-engaging rollers on the outer ends of the rods, and spring means compressed between the tubes and outer portions of the rods.

10. A center-wind reel assembly comprising a support, a driven spindle extending from said support, said spindle having an enlarged diameter head adjacent to said support, a radial longitudinal rib on the spindle extending outwardly from said head, an outwardly spring-pressed radial detent on said spindle, said detent being spaced outwardly from said rib, a spacer sleeve engaged on said spindle and having an inner end engaged with said head, slot means in the inner end of the spacer sleeve receiving said rib, an external radial longitudinal lug secured on said spacer sleeve at the outer end of the spacer sleeve, said spacer sleeve being substantially shorter than the spindle, said spindle having an outer end portion extending from said lug to the outer end of the spindle, a hub assembly engaged on said outer end portion of the spindle, said assembly being formed with slot means receiving said lug, and a center-wind reel keyed on said hub assembly.

11. A center-wind reel assembly according to claim 10, wherein said reel comprises an inner section having an axial opening receiving said hub assembly, an outer reel section formed with an axial opening receiving said hub assembly, and means spacing said outer reel section from said inner reel section.

12. A center-wind reel assembly according to claim 10, wherein said reel comprises an inner section having an axial opening receiving said hub assembly, an outer reel section formed with an axial opening receiving said hub assembly, and means spacing said outer reel section from said inner reel section, said hub assembly comprising an outer sleeve larger in diameter than said spindle and engaged in the opening of the inner reel section, said sleeve having an outer end engaged with the inner side of the outer reel section and a lateral flange on its inner end engaged with the inner side of the inner reel section, a hollow cup-shaped hub having a sleeve engaged in said outer sleeve, said hub sleeve having a lateral flange engaged with the outer side of the outer reel section, said hub sleeve being engaged through the axial opening of the outer reel section, said hub having outer and inner end walls, said inner end wall being formed with an axial opening passing said spindle, and with radial slot means receiving the spindle lug.

13. A center-wind reel assembly according to claim 10, wherein said reel comprises an inner section having an axial opening receiving said hub assembly, an outer reel section formed with an axial opening receiving said hub assembly, and means spacing said outer reel section from said inner reel section, said hub assembly comprising an outer sleeve larger in diameter than said spindle and engaged in the opening of the inner reel section, said sleeve having an outer end engaged with the inner side of the outer reel section and a lateral flange on its inner end engaged with the inner side of the inner reel section, a hollow cup-shaped hub having a sleeve engaged in said outer sleeve, said hub sleeve having a lateral flange engaged with the outer side of the outer reel section, said hub sleeve being engaged through the axial opening of the outer reel section, said hub having outer and inner end walls, said inner end wall being formed with an axial opening passing said spindle, and with radial slot means receiving the spindle lug, said outer end wall of the hub being formed with an axial opening and radial slot means entering th axial opening, for alternately receiving the spindle and the spindle lug.

References Cited

UNITED STATES PATENTS

| | | | |
|---|---|---|---|
| 1,939,884 | 12/1933 | Falls | 242—55.21 |
| 2,481,708 | 9/1949 | Adams | 242—55.21 |
| 2,734,692 | 2/1956 | Robinson | 242—74.2 |

LEONARD D. CHRISTIAN, *Primary Examiner.*